(12) United States Patent
Currie et al.

(10) Patent No.: US 12,448,318 B2
(45) Date of Patent: Oct. 21, 2025

(54) COMPOSITION, PASTE AND METHODS

(71) Applicant: Fenzi AGT Netherlands B.V., Maastricht (NL)

(72) Inventors: Edwin Peter Kennedy Currie, Maastricht (NL); Svetlana N. Emelianova, Maastricht (NL); Hong Ren, Reading (GB); Maxence Valla, Maastricht (NL)

(73) Assignee: Fenzi AGT Netherlands B.V., Maastricht (NL)

( * ) Notice: Subject to any disclaimer, the term of this patent is extended or adjusted under 35 U.S.C. 154(b) by 996 days.

(21) Appl. No.: 17/615,465

(22) PCT Filed: Jun. 19, 2020

(86) PCT No.: PCT/GB2020/051485
§ 371 (c)(1),
(2) Date: Nov. 30, 2021

(87) PCT Pub. No.: WO2021/009477
PCT Pub. Date: Jan. 21, 2021

(65) Prior Publication Data
US 2022/0227659 A1    Jul. 21, 2022

(30) Foreign Application Priority Data
Jul. 15, 2019 (GB) ..................... 1910100

(51) Int. Cl.
| C03C 3/066 | (2006.01) |
| C03C 8/04 | (2006.01) |
| C03C 8/06 | (2006.01) |
| C03C 8/14 | (2006.01) |
| C03C 8/22 | (2006.01) |
| C03C 27/00 | (2006.01) |

(52) U.S. Cl.
CPC ............... *C03C 3/066* (2013.01); *C03C 8/04* (2013.01); *C03C 8/06* (2013.01); *C03C 8/14* (2013.01); *C03C 8/22* (2013.01); *C03C 27/00* (2013.01)

(58) Field of Classification Search
CPC .... C03C 8/02; C03C 8/04; C03C 8/06; C03C 8/14; C03C 3/06
See application file for complete search history.

(56) References Cited

U.S. PATENT DOCUMENTS

| 6,255,239 B1 | 7/2001 | Sakoske |
| 6,998,776 B2 | 2/2006 | Aitken |
| 2004/0155227 A1 | 8/2004 | Bechtloff et al. |
| 2011/0146776 A1* | 6/2011 | Carroll ..................... C03C 8/18 252/514 |
| 2014/0026619 A1 | 1/2014 | Maloney et al. |

FOREIGN PATENT DOCUMENTS

| CN | 101113075 A | 1/2008 |
| CN | 101565268 A | 10/2009 |
| CN | 105502949 A | 4/2016 |
| CN | 107721183 A | 2/2018 |
| EP | 1006088 A1 | 6/2000 |
| EP | 2168927 A1 | 3/2010 |
| JP | 2000211942 A | 8/2000 |
| JP | 2003034550 A | 2/2003 |
| JP | 2003095697 A | 4/2003 |
| JP | 2007 169162 A | 7/2007 |
| JP | 2006524419 A5 | 11/2008 |
| JP | 2009120462 A | 6/2009 |
| JP | 2009278483 A | 11/2009 |
| JP | 2011046601 A | 3/2011 |
| JP | 2013514956 A | 5/2013 |
| JP | 2014534145 A | 12/2014 |
| KR | 20040030562 A | 4/2004 |
| KR | 1020130109754 A | 10/2013 |
| TW | 200624402 A | 7/2006 |
| TW | 201033152 A | 9/2010 |
| WO | 2013039940 A1 | 3/2013 |

\* cited by examiner

*Primary Examiner* — Elizabeth A. Bolden
(74) *Attorney, Agent, or Firm* — BakerHostetler

(57) ABSTRACT

A composition for sealing inorganic substrates, the composition comprising a glass frit and a filler material, wherein said glass frit comprises: 60 to 85 wt % $Bi_2O_3$; 3 to 15 wt % ZnO; 2 to 10 wt % $B_2O_3$; 0.6 to 5 wt % $SiO_2$; 0.6 to 5 wt % $Al_2O_3$; and 0.1 to 0.5 wt % of a compound selected from NaF and $BaF_2$.

14 Claims, No Drawings

COMPOSITION, PASTE AND METHODS

FIELD OF THE INVENTION

The present invention relates to a composition and a paste suitable for forming a seal and/or bond between substrates, for example, glass or ceramic substrates. The present invention further relates to methods, articles and uses.

BACKGROUND

Glass frit is commonly employed in the formation of seals or bonds between inorganic substrates, such as glass substrates. In particular, glass frit may be used in the formation of hermetic seals in articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

Typically, glass frit is applied to a substrate in the form of a paste, for example, by screen-printing. The paste may comprise particles of glass frit dispersed in a liquid dispersion medium. After application to a substrate the paste may undergo a drying step followed by a firing step. Prior to firing, the substrates to be sealed/bonded may be assembled in the required configuration with the glass frit sandwiched there-between. During firing, the frit undergoes heat treatment causing the frit to soften, flow and adhere to the substrates, thereby forming the bond or seal.

Conventional firing techniques have employed oven-heating in which the entire assembly (i.e. the substrates to be sealed/bonded, frit and any components to be encapsulated within) is subjected to the heat treatment. However, in applications where the use of tempered glass substrates and/or coated glass substrates is desirable (for example, VIG window units), exposure to high temperature environments may reduce the temper strength of substrates and/or degrade coatings applied thereto. Further, the maximum temperature that may be employed during firing is dictated by the most heat sensitive component of the entire assembly. Thus, it may be desirable that frits to be employed in sealing/bonding applications have a low softening point.

Suitable glass frit compositions having a low softening point have conventionally comprised lead oxide as a major component. However, due to environmental concerns, the use of lead is now undesirable.

Vanadium oxide containing glass compositions have been employed as an alternative to lead-based glass compositions. However, due to toxicity concerns, the use of vanadium oxide is also undesirable.

Certain bismuth oxide containing compositions have been proposed as low softening point alternatives to lead-containing or vanadium-containing glass compositions. However, it has been found that undesirable crystallisation may occur during firing of such frits and that such frits may have a relatively narrow sealing temperature operating window. The "sealing temperature operating window" of a sealing composition may be considered to be the difference between the softening temperature and the temperature at which the onset of crystallisation occurs (crystallisation point). Crystallisation during firing may lead to reduced strength of the resulting bond or seal.

Localized laser heating has also been employed as a firing technique in sealing applications, whereby the glass frit, or an area proximate where the glass frit is deposited, is selectively heated by laser irradiation to effect the sealing or bonding of substrates without significantly heating the substrates or any encapsulated components themselves.

Glass frit compositions for use in laser sealing, must be capable of absorbing radiation at the wavelength of the laser employed. Ideally, the wavelength of the laser is such that the laser energy is easily transmitted through the substrates to be sealed. In this manner, the laser may pass through the substrates without significant absorption, leaving the substrates relatively unheated, while at the same time the laser energy is absorbed by the glass frit, thereby selectively heating the frit to effect the firing thereof and the formation of a bond or seal.

Typically, glass frit compositions are chosen to have a coefficient of thermal expansion (CTE) as close as possible to that of the substrates to be sealed so as to enhance the mechanical strength, reduce interfacial stress and improve crack resistance of the resulting seal/bond. Further, the composition of glass frit should be such that the resulting seal/bond has high chemical durability.

There remains a need in the art for compositions which provide an improved balance of properties. In particular, there remains a need in the art for non-toxic compositions having reduced crystallisation tendencies and/or lower sealing temperatures and/or wider sealing temperature operating windows, which produce seals of adequate strength and chemical durability.

SUMMARY OF THE INVENTION

According to a first aspect of the present invention, there is provided a composition for sealing inorganic substrates, the composition comprising a glass frit and a filler material, wherein said glass frit comprises:
  60 to 85 wt % $Bi_2O_3$;
  3 to 15 wt % ZnO;
  2 to 10 wt % $B_2O_3$;
  0.5 to 5 wt % $SiO_2$;
  0.5 to 5 wt % $Al_2O_3$; and
  0.1 to 0.5 wt % of a compound selected from NaF and $BaF_2$.

According to a further aspect of the present invention, there is provided a material for sealing inorganic substrates, the material comprising:
  (i) a glass powder which comprises one or more frit compositions, at least one of the frit compositions being as defined above;
  (ii) a laser absorbing material (which may be incorporated into one or more of the glass frits, into a filler material, or provided as a separate additional material); and
  (iii) an organic medium.

According to a further aspect of the present invention, there is provided a method of preparing a paste comprising mixing:
  (i) a composition as hereinbefore described; and
  (ii) an organic medium.

According to a further aspect of the present invention, there is provided the use of a composition as hereinbefore described to form a paste.

According to a further aspect of the present invention, there is provided a method of forming a bond or seal between inorganic substrates, the method comprising:
  (i) providing a first inorganic substrate;
  (ii) providing a second inorganic substrate;
  (iii) depositing a paste as hereinbefore described onto at least a portion of at least one of the inorganic substrates;

(iv) drying said paste to form a dried coating;

(v) preferably pre-firing the dried coating to remove the organic binder (optionally the drying and organic binder removal steps may be performed in a single step);

(vi) assembling the first and second substrates such that the dried/pre-fired coating lies therebetween and in contact with both substrates; and (vii) firing said dried/pre-fired coating.

According to a further aspect of the present invention, there is provided an article comprising at least two inorganic substrates being connected by a bond or a seal, wherein the bond or seal is obtained or obtainable by the method as hereinbefore described.

According to a further aspect of the present invention, there is provided the use of a composition or paste as hereinbefore described to form a seal or bond between two substrates.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Where ranges are specified herein it is intended that each endpoint of the range is independent. Accordingly, it is expressly contemplated that each recited upper endpoint of a range is independently combinable with each recited lower endpoint, and vice versa.

The compositions of the glass frits described herein are given as weight percentages. These weight percentages are with respect to the total weight of the glass frit. The weight percentages are the percentages of the components used as starting materials in preparation of the glass frits, on an oxide basis. As the skilled person will understand, starting materials such as oxides, carbonates or nitrates may be used in preparing the glass frits of the present invention. Where a non-oxide starting material is used to supply a particular element to the glass frit, an appropriate amount of starting material is used to supply an equivalent molar quantity of the element had the oxide of that element been supplied at the recited wt %. This approach to defining glass compositions is typical in the art. As the skilled person will readily understand, volatile species (such as oxygen) may be lost during the manufacturing process of the glass frit, and so the composition of the resulting glass frit may not correspond exactly to the weight percentages of starting materials, which are given herein on an oxide basis. Analysis of an obtained glass frit by a process known to those skilled in the art, such as Inductively Coupled Plasma Emission Spectroscopy (ICP-ES), can be used to calculate the starting components of the glass frit composition in question.

The compositions of the present invention comprise a glass frit and a filler material, wherein said glass frit comprises:

60 to 85 wt % $Bi_2O_3$;
3 to 15 wt % ZnO;
2 to 10 wt % $B_2O_3$;
0.5 to 5 wt % $SiO_2$;
0.5 to 5 wt % $Al_2O_3$; and
0.1 to 0.5 wt % of a compound selected from NaF and $BaF_2$.

It was found that very high levels of $Bi_2O_3$ in the glass frits resulted in crystallisation occurring during firing, which inhibited flow and was detrimental to the quality of the final seal. Furthermore, even though adverse crystallisation could be reduced by lowering the $Bi_2O_3$ content in the glass frits this resulted in an increased softening temperature ($T_f$), which was also found to affect flow and therefore sealing performance. Accordingly, the glass frits employed in the compositions of the present invention comprise 60 to 85 wt % $Bi_2O_3$. Preferably, the glass frits employed in the compositions of the present invention comprise 65 to 80 wt % $Bi_2O_3$, more preferably 66 to 79 wt % $Bi_2O_3$, and even more preferably 67 to 78 wt % $Bi_2O_3$ (e.g. 68.2 or 77.8 wt % $Bi_2O_3$).

The glass frits employed in the compositions of the present invention comprise 3 to 15 wt % ZnO. Preferably, the glass frits employed in the compositions of the present invention comprise 5 to 12 wt % ZnO, more preferably 6 to 10 wt % ZnO, and even more preferably 6.5 to 10 wt % ZnO (e.g. 6.7 or 9.7 wt % ZnO).

The glass frits employed in the compositions of the present invention comprise 2 to 10 wt % $B_2O_3$. Preferably, the glass frits employed in the compositions of the present invention comprise 2.5 to 8 wt % $B_2O_3$, more preferably 3 to 6 wt % $B_2O_3$, and even more preferably 3.5 to 5.5 wt % $B_2O_3$ (e.g. 3.7 or 5.5 wt % $B_2O_3$).

It was found that the presence of $SiO_2$ in the glass frits helped to lower the CTE of the compositions of the present invention so that it better matched that of the substrates to be sealed. Accordingly, the glass frits employed in the compositions of the present invention comprise 0.5 to 5 wt % $SiO_2$. Preferably, the glass frits employed in the compositions of the present invention comprise 0.8 to 3 wt % $SiO_2$, more preferably 1 to 2 wt % $SiO_2$, and even more preferably 1 to 1.5 wt % $SiO_2$.

It was found that the presence of $Al_2O_3$ in the glass frits helped to lower the CTE of the compositions of the present invention so that it better matched that of the substrates to be sealed. Accordingly, the glass frits employed in the compositions of the present invention comprise 0.5 to 5 wt % $Al_2O_3$. Preferably, the glass frits employed in the compositions of the present invention comprise 0.8 to 3 wt % $Al_2O_3$, more preferably 1 to 2 wt % $Al_2O_3$, and even more preferably 1 to 1.5 wt % $Al_2O_3$ (e.g. 1.1 or 1.5 wt % $Al_2O_3$).

It was found that the presence of small amounts of NaF or $BaF_2$ in the glass frits was necessary to achieve a sufficiently low softening temperature ($T_f$). Fluoride acts as a fluxing agent, which reduces the melting/firing temperature of the glass. Accordingly, the glass frits employed in the compositions of the present invention comprise 0.1 to 0.5 wt % of a compound selected from NaF and $BaF_2$. Preferably, the glass frits employed in the compositions of the present invention comprise 0.1 to 0.4 wt % of a compound selected from NaF and $BaF_2$, more preferably 0.1 to 0.3 wt % of a compound selected from NaF and $BaF_2$, and even more preferably 0.1 to 0.2 wt % of a compound selected from NaF and $BaF_2$.

Preferably, the glass frits employed in the compositions of the present invention further comprise one or more alkali metal oxides, for example one or more compounds selected from $Li_2O$, $Na_2O$, $K_2O$, and $Rb_2O$, preferably one or more compounds selected from $Li_2O$, $Na_2O$ and $K_2O$. In some embodiments, the glass frits employed in the compositions of the present invention may further comprise 0 to 5 wt %, preferably 0.5 to 5 wt %, more preferably 1 to 3 wt %, even more preferably 1.5 to 2.5 wt % of one or more alkali metal oxides.

Preferably, the glass frits employed in the compositions of the present invention further comprise BaO. BaO is used for preventing/suppressing the crystallisation of the obtained glass frit. In some embodiments, the glass frits employed in the compositions of the present invention may further comprise 0 to 2 wt %, preferably 0.3 to 2 wt %, more preferably 0.5 to 1 wt %, even more preferably 0.5 to 0.7 wt % of BaO.

Preferably, the glass frits employed in the compositions of the present invention further comprise one or more transition metal oxides. For example, the glass frits employed in the compositions of the present invention may comprise one or more selected from nickel oxide (NiO), manganese (II) oxide (MnO), manganese (III) oxide, iron oxide ($Fe_2O_3$), copper oxides (CuO), cobalt oxide (CoO), and chromium oxide ($Cr_2O_3$). Advantageously, the presence of transition metal oxides may result in the glass frit being dark in colour. Darker coloured frits are more susceptible to absorption of radiation. Thus, where the glass frit comprises transition metal oxides, the compositions of the present invention may be more suited to undergo firing via selective heating techniques such as laser irradiation.

In some embodiments, the glass frits employed in the compositions of the present invention may comprise at least 0.1-8 wt. % (e.g. 0.5 to 8 wt. %) in total of transition metal oxides. In some embodiments, the glass frit may comprise 0.1-6 wt % (e.g. 1.5 to 6 wt. %) or less in total of transition metals oxides. For example, the glass frit may comprise 0.1 to 5 wt % (e.g. 2 to 5 wt. %) in total of transition metal oxides.

Preferably, the glass frits employed in the compositions of the present invention further comprise CuO. In some embodiments, the glass frits employed in the compositions of the present invention may further comprise 0 to 2 wt % (e.g. 0.1 to 2 wt. %), more preferably 0.1 to 1.5 wt %, more preferably 0.2 to 0.5 wt % CuO.

Preferably, the glass frits employed in the compositions of the present invention further comprise $Mn_2O_3$. In some embodiments, the glass frits employed in the compositions of the present invention may further comprise 0 to 2 wt % (e.g. 0.1 to 2 wt. %), more preferably 0.1 to 1.5 wt %, more preferably 0.2 to 0.5 wt % $Mn_2O_3$.

Preferably, the glass frits employed in the compositions of the present invention further comprise $Fe_2O_3$. In some embodiments, the glass frits employed in the compositions of the present invention may further comprise 0 to 2 wt % (e.g. 0.1 to 2 wt. %), more preferably 0.1 to 1.5 wt %, more preferably 0.2 to 0.5 wt % $Fe_2O_3$.

Preferably, the glass frits employed in the compositions of the present invention further comprise $Cr_2O_3$. In some embodiments, the glass frits employed in the compositions of the present invention may further comprise 0 to 15 wt % (e.g. 0.1 to 15 wt. %), more preferably 0.1 to 12 wt %, more preferably 0.1 to 9 wt % $Cr_2O_3$.

Preferably, the glass frits employed in the compositions of the present invention further comprise a laser absorber. In some embodiments, the glass frits employed in the compositions of the present invention may further comprise 0 to 10 wt %, more preferably 2 to 8 wt %, more preferably 3 to 7 wt % of a laser absorber. The laser absorber may be a coloured material such as a pigment which is tailored to absorb laser light. Examples of suitable pigments include a $MnO/CuO/Cr_2O_3$ based pigment or a $CuCr_2O_4$ based pigment or a $FeMnCrO_3$ based pigment or a $MnO/CuO/Cr_2O_3/NiO$ based pigment.

In the final paste, a wt % ratio of $Bi_2O_3/ZnO$ is preferably between 4 and 28. A wt % ratio of $ZnO/B_2O_3$ is preferably between 0.3 and 7.5. A wt % ratio of $Bi_2O_3/F$ is preferably between 120 and 850. A wt % ratio of $Bi_2O_3/Al_2O_3$ is preferably between 12 and 170.

The compositions of the present invention may be substantially free of certain components. As used herein, the term "substantially free of" in relation to a composition means that the composition has a total content of the recited component of less than or equal to 0.1 wt %. As will be readily understood by the skilled person, during manufacture of glass frit particles, the glass composition may be contaminated with low levels of impurities. For example, in a melt/quench glass forming process, such impurities may derive from refractory linings of vessels employed in the melting step. Thus, whilst a total absence of a particular component may be desirable, in practice this may be difficult to achieve. As used herein, the term "no intentionally added X", where X is a particular component, means that no raw material was employed in the manufacture of the glass frit which was intended to deliver X to the final glass composition, and the presence of any low levels of X in the glass frit composition is due to contamination during manufacture.

Due to toxicity concerns, the use of lead-containing compounds in the compositions of the present invention may be undesirable. Thus, in preferred compositions of the present invention, the compositions are substantially lead-free. As used herein, the term "substantially lead-free" is intended to include compositions which contain no intentionally added lead. For example, the compositions may include less than 0.1 wt % PbO, less than 0.05 wt %, less than 0.01 wt % or less than 0.005 wt % PbO.

In some preferred compositions of the present invention, the compositions are substantially vanadium-free. As used herein, the term "substantially vanadium-free" is intended to include compositions which contain no intentionally added vanadium. For example, the compositions may include less than 0.1 wt % vanadium oxides, less than 0.05 wt %, less than 0.01 wt % or less than 0.005 wt % vanadium oxides.

The glass frits employed in the compositions of the present invention preferably consist essentially of a glass frit composition as described herein, and incidental impurities (such as impurities picked up during manufacture of the composition). In that case, as the skilled person will readily understand that the total wt % of the recited constituents will be 100 wt %, any balance being incidental impurities. Preferably, any incidental impurity will be present at 0.1 wt % or less, 0.05 wt % or less, 0.01 wt % or less, 0.005 wt % or less, 0.001 wt % or less, or 0.0001 wt % or less.

For example, preferred glass frits consist essentially of:
(i) 60 to 85 wt % $Bi_2O_3$;
(ii) 3 to 15 wt % ZnO;
(iii) 2 to 10 wt % $B_2O_3$;
(iv) 0.5 to 5 wt % $Si_2O_2$;
(v) 0.5 to 5 wt % $Al_2O_3$;
(vi) 0.1 to 0.5 wt % of a compound selected from NaF and $BaF_2$;
(vii) 0 to 5 wt % of one or more compounds selected from $Li_2O$, $Na_2O$, $K_2O$, and $Rb_2O$;
(viii) 0 to 2 wt % BaO;
(ix) 0 to 2 wt % CuO;
(x) 0 to 2 wt % $Mn_2O_3$;
(xi) 0 to 2 wt % $Fe_2O_3$;
(xii) 0 to 13 wt % $Cr_2O_3$; and
(xiii) incidental impurities.

The glass frits employed in the compositions of the present invention preferably have a $d_{90}$ particle size of less than 20 µm. In some embodiments, the particles of the glass frit may have a $d_{90}$ particle size of 1 to 15 μm, preferably 2 to 10 μm, more preferably 3 to 8 μm.

The term "$d_{90}$ particle size" herein refers to particle size distribution, and a value for $d_{90}$ particle size corresponds to the particle size value below which 90%, by volume, of the total particles in a particular sample lie. The $d_{90}$ particle size may be determined using a laser diffraction method (e.g. using a Malvern Mastersizer 3000).

The compositions of the present invention preferably have a $d_{50}$ particle size of less than 4.9 microns. In some embodiments, the particles of the glass frit may have a $d_{50}$ particle size of 1.8 to 4.5 μm, preferably 2.0 to 4.0 μm, more preferably 2.3 to 3.5 μm.

The term "$d_{50}$ particle size" herein refers to particle size distribution, and a value for D50 particle size corresponds to the particle size value below which 50%, by volume, of the total particles in a particular sample lie. The $d_{50}$ particle size may be determined using a laser diffraction method (e.g. using a Malvern Mastersizer 3000).

The glass frits employed in the compositions of the present invention preferably have a coefficient of thermal expansion (CTE) which is less than or equal to $10 \times 10^{-6}$/K, more preferably less than or equal to $9.5 \times 10^{-6}$/K, even more preferably less than or equal to $9.0 \times 10^{-6}$/K, as measured using a dilatometer. A suitable dilatometer is a DIL803 Dual Sample Dilatometer, which is available from TA instruments.

The glass frits employed in the compositions of the present invention may be prepared by mixing together the required raw materials and melting them to form a molten glass mixture, then quenching to form a glass (melt/quench glass forming). The process may further comprise milling the resulting glass to provide glass frit particles of the desired particle size. For example, the glass may be milled using jet-milling process or a bead-milling process, such as wet bead-milling in an alcohol-based or a water-based solvent. The skilled person is aware of alternative suitable methods for preparing glass frit. Suitable alternative methods include water quenching, sol-gel processes and spray pyrolysis.

The glass frit compositions of the present invention preferably have a dilatometric softening point temperature ($T_f$) in the range 300 to 500° C. For example, the glass frit compositions may have a $T_f$ in the range in the range 360 to 460° C.

As used herein, the term "softening point", or "$T_f$" means the first temperature at which indications of softening or deformation of a glass are observed, as measured by hot stage microscopy (HSM).

The glass frit compositions of the present invention preferably have a glass transition temperature ($T_g$) in the range 300 to 400° C. For example, the glass frit compositions may have a $T_g$ in the range 340 to 375° C.

As used herein, the term "glass transition temperature", or "$T_g$" means the glass transition temperature as measured according to the ASTM E967 "Standard Test Method for Assignment of the Glass Transition Temperature by Differential Scanning calorimetry".

The compositions of the present invention comprise a filler material (also known as a CTE filler or a low expansion filler). As used herein, the term "filler material" is a material which lowers the CTE of a composition. Preferably, the compositions of the present invention comprise 1 to 15 wt %, more preferably 2 to 12 wt %, more preferably 3 to 8 wt % of a filler material based upon the total weight of the composition.

Preferably, the filler material is a zirconium oxide material, an aluminium oxide material, cordierite, or an aluminosilicate glass frit. More preferably, the filler material is an aluminosilicate glass frit having the following composition:
62-75 wt % $SiO_2$;
18-28 wt % $Al_2O_3$;
3-7 wt % CaO;
3-5 wt % ZnO;
1.5-4 wt % $Li_2O$;
2.3-3.8 wt % BaO; and
0.1-1 wt % MgO.

The aluminosilicate glass frit filler material may be prepared in the same manner as described above in relation to the glass frit employed in the compositions of the present invention.

Alternatively, the filler material may be a sintered material comprising an aluminosilicate glass frit and a laser absorber (e.g. a $MnO/CuO/Cr_2O_3$-based pigment). More preferably, the filler material is a sintered material comprising an aluminosilicate glass frit and a laser absorber having the following composition:
75 wt % aluminosilicate glass frit powder; and
25 wt % of a $MnO/CuO/Cr_2O_3$-based pigment.

The sintered material comprising an aluminosilicate glass frit powder and a laser absorber may be prepared by dry blending of the two powders followed by sintering in a muffle furnace at 900° C. The heating rate was 15° C./min, dwell time of 180 min, the cooling down rate was 10° C./min. After sintering the powder was milled in a rosette mill to a particle size distribution of 7.5 μm.

In some embodiments, the compositions of the present invention may comprise two or more different types of filler material.

Preferably, the compositions of the present invention further comprise a laser absorber. In some embodiments, the compositions of the present invention may further comprise 0 to 20 wt %, more preferably 5 to 17 wt %, more preferably 7 to 12 wt % of a laser absorber based upon the total weight of the composition.

Preferably, the laser absorber is a $MnO/CuO/Cr_2O_3$-based pigment or $CuCr_2O_4$ based pigment or $FeMnCrO_3$ based pigment or $MnO/CuO/Cr_2O_3/NiO$ based pigment. Preferably, the filler material has a D90 particle similar to that of the glass frit, i.e. preferably less than 9 microns. In some embodiments, the filler material may have a D90 particle size of 2 to 8 microns, preferably 2.3 to 7 microns, more preferably 2.5 to 4.5 microns.

Preferably, the laser absorber has a D90 particle similar to that of the glass frit, i.e. preferably less than 10 microns. In some embodiments, the laser absorber may have a D90 particle size of 0.5 to 8 microns, preferably 1 to 5 microns, more preferably 1.5 to 3 microns.

The compositions of the present invention may be prepared by dry mixing the glass frit with the filler material and, if present, the laser absorber (e.g. in a speed mixer).

In preferred embodiments, the compositions of the present invention are in the form of a paste.

The pastes of the present invention comprise:
(i) a composition as hereinbefore described, and
(ii) an organic medium.

The pastes of the present invention may be applied onto a substrate (e.g. via printing) in order to deposit the composition onto the substrate.

As used herein, the term "organic medium" refers to a substance which is in the liquid phase at the conditions intended for application of the paste to a substrate (i.e. printing conditions). Thus, at ambient conditions the organic medium may be solid or a liquid too viscous for printing. As the skilled person will readily understand, combination of the compositions of the present invention with an organic medium to form the paste may take place at elevated temperature if required.

The organic medium to be employed in the present invention may be selected on the basis of the intended method of applying the paste to a substrate.

In one embodiment, the dispersion medium adequately suspends the composition at application conditions, and is removed completely during drying of the applied paste and/or firing of the deposited composition. Factors influencing the choice of medium include solvent viscosity, evaporation rate, surface tension, odour and toxicity. Suitable mediums preferably exhibit non-Newtonian behavior at printing conditions. Suitably, the medium comprises one or more of water, alcohols (e.g. tridecyl alcohol), glycol ethers, lactates, glycol ether acetates, aldehydes, ketones, aromatic hydrocarbons and oils. Mixtures of two or more solvents are also suitable.

Preferred pastes of the present invention comprise 70 to 95 wt % of a composition as described hereinbefore, more preferably 75 to 90 wt % (e.g. 87 wt %) based on the total weight of the paste, and 5 to 30 wt %, more preferably 10 to 25 wt % (e.g. 13 wt %) of an organic medium based on the total weight of the paste.

Preferred pastes of the present invention may further comprise one or more additives. These may include dispersants, binders, resins, viscosity/rheology modifiers wetting agents, thickeners, stabilisers and surfactants.

The pastes of the present invention are preferably substantially lead-free, that is, any lead-containing components are substantially absent from the paste. For example, the paste may comprise less than 0.1 wt. % lead.

The pastes of the present invention are preferably substantially vanadium-free, that is, any vanadium-containing components are substantially absent from the paste. For example, the paste may comprise less than 0.1 wt. % vanadium.

The pastes of the present invention may be prepared by mixing:
(i) a composition as hereinbefore described; and
(ii) an organic medium.

The components may be mixed, for example, using a propeller mixer, a high shear mixer, or a bead-mill. In some embodiments, the organic medium and/or the combined components may be heated prior to and/or during mixing.

In some cases, it may be desirable to mill the compositions of the present invention to the desired particle size after they have been combined with the organic medium. Suitable milling techniques include bead milling, ball milling, basket milling or other appropriate wet milling techniques.

The pastes of the present invention may be employed in a method of forming a bond or seal between inorganic substrates (e.g. in a method of forming a hermetic seal between two glass substrates), the method comprising:
(i) providing a first inorganic substrate;
(ii) providing a second inorganic substrate;
(iii) depositing a paste as hereinbefore described onto at least a portion of at least one of the inorganic substrates;
(iv) drying said paste to form a dried coating;
(v) pre-firing said coating at a given temperature
(vi) assembling the first and second substrates such that the dried coating lies therebetween and in contact with both substrates; and
(vii) firing said pre-fired coating.

Deposition of the paste onto at least a portion of at least one of the inorganic substrates in step (iii), may be achieved by applying a layer of the paste hereinbefore described onto the portion of the substrate. The layer of paste may be applied to the inorganic substrate(s) via a suitable printing method. For example, the layer of paste may be applied to the inorganic substrate(s) via inkjet printing, screen printing, roller coating or by dispenser application. In a preferred embodiment, the paste is applied to the inorganic substrate(s) via screen printing.

The applied layer of paste preferably has a wet layer thickness in the range 10 to 60 microns, more preferably in the range 15 to 55 microns, even more preferably in the range 20 to 50 microns. The wet layer thickness of the applied layer of paste may vary depending on the intended end use of the final sealed articles.

After application of the paste layer to the inorganic substrate(s) and prior to firing, the applied coating undergoes a drying step (iv) for removal or partial removal of solvents present in the organic medium. Drying may be carried out at temperatures of up to 200° C., more preferably temperatures of up to 150° C. Drying may be carried out, for example, by air drying the applied layer at ambient temperature, by heating the paste-coated substrate in a suitable oven, or by exposing the paste-coated substrate to infrared radiation.

A pre-firing heat treatment up to 350° C. is applied to the dried coating to fully remove organic carrier/binder material.

On the final firing of the pre-fired coating, particles of the glass frit soften, flow and adhere to each of the substrates, thereby creating a bond or seal connecting the substrates. Advantageously, it has been found that the compositions of the present invention can achieve a hermetic seal, having high mechanical strength and chemical durability.

Preferably, the dried paste is fired via convective heating. Thus, in preferred methods of the invention, the dried paste is fired by heating the assembly of the first and second substrates with the dried paste lying therebetween and in contact with both substrates, to a temperature sufficiently high to cause particles of the glass frits to soften, flow and adhere to the substrate, and to burn off any remaining components deriving from the organic medium. For example, the firing may be carried out by heating the assembly to a temperature in the range 400 to 550° C., for example, 440 to 460° C. Heating the assembly may be carried out via convective heating, for example, using a suitable furnace, such as a continuous line furnace.

Alternatively, the dried paste may be fired via radiative heating, for example, by irradiating the dried coating with an appropriate source of radiation.

Where the dried coating is fired by irradiating with radiation, the source of radiation may be, for example, a laser or an infrared lamp. Ideally, the wavelength of the radiation is such that the radiation is easily transmitted through the substrates to be sealed. In this manner, the radiation may pass through the substrates without significant absorption, leaving the substrates relatively unheated, while at the same time the laser energy is absorbed by the glass frit present, thereby selectively heating the dried paste to effect the firing thereof.

In some embodiments, firing of the dried coating may be carried out using a combination of convective and radiative heating. In some embodiments, convective and radiative heating may be employed in parallel to effect firing of the particle mixture. In other embodiments, convective and radiative heating may be employed in sequence. For example, firing of the dried paste may be effected by first heating the assembly via convective heating, followed by irradiating the dried coating with an appropriate source of radiation.

In the method of forming a seal or bond between two inorganic substrates of the present invention, each inorganic substrate may be a glass substrate, a ceramic substrate or a metal substrate. In a preferred embodiment, each substrate is a glass substrate, for example, a borosilicate glass substrate or a chemically tempered or thermally tempered soda lime glass substrate. The inorganic substrates preferably have a CTE in the range 4 to $9 \times 10^{-6}$/K.

The compositions and pastes of the present invention may, for example, be employed in the formation of seals (e.g. hermetic seals) in the manufacture of articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

The present invention also provides an article comprising at least two inorganic substrates being connected by a bond or a seal, wherein the bond or seal is obtained or obtainable by a method as hereinbefore described. Preferably, the article is a vacuum insulated glass unit (e.g. a vacuum insulated glass window). Alternatively, the article is an OLED display.

The present invention also provides the use of a composition as hereinbefore described to form a paste.

The present invention also provides the use of a composition or paste as hereinbefore described to form a seal or bond between two substrates. The present invention also provides the use of a composition or paste as hereinbefore described to form a vacuum insulated glass unit. The present invention also provides the use of a composition or paste as hereinbefore described to form an OLED display.

The present invention also provides a package comprising a paste as hereinbefore described.

EXAMPLES

The invention will now be further described with reference to the following examples, which are illustrative, but not limiting of the invention.

Materials

Glass frits and sintered compositions were prepared using commercially available raw materials. The table below summarizes the raw materials used:

| Raw material | Impurities grade |
|---|---|
| $Bi_2O_3$ | 99.5 |
| $Li_2CO_3$ | 99.0 |
| NaF | 98.0 |
| $Al_2O_3$ | 99.5 |
| $H_3BO_3$ | 99.0 |
| ZnO | 99.7 |
| $KNO_3$ | 99.8 |
| $SiO_2$ | 99.6 |
| $Fe_2O_3$ | 96.5 |
| $MnCO_3$ | 90.0 |
| CuO | 97.5 |
| $BaF_2$ | 98.5 |

Example 1: Preparation of Glass Frits

Glass frits were prepared using commercially available raw materials. The composition of each glass frit is given in Table 1 below.

TABLE 1

| Glass frit composition, wt % | | | |
|---|---|---|---|
| | A | B | C |
| $Bi_2O_3$ | 77.8 | 68.2 | 79 |
| ZnO | 9.7 | 6.7 | 9.9 |
| $B_2O_3$ | 5.5 | 3.7 | 5.6 |
| $SiO_2$ | 1.6 | 1.1 | 1.7 |
| $Al_2O_3$ | 1.5 | 1.1 | 1.2 |
| $K_2O$ | 1.2 | 1 | 0.4 |
| BaO | 0.7 | 0.5 | 0.7 |
| $Na_2O$ | 0.6 | 0.4 | |
| $Li_2O$ | 0.3 | 0.2 | 0.3 |
| $Mn_2O_3$ | 0.3 | 2.5 | |
| CuO | 0.3 | 5.3 | 1.1 |
| $Fe_2O_3$ | 0.3 | 0.1 | |
| $Cr_2O_3$ | | 9.1 | |
| F* | 0.2 | 0.1 | |
| $T_g$, ° C. | 330 | 360 | 358 |
| $T_f$, ° C. | 375 | 435 | 415 |
| CTE $\times 10^{-6}$/K | 10 | 9.0 | 10.4 |
| D(90), μm | 2.8 | 2.9 | 3 |

*F comes from NaF and/or BaF2

Glass frits A and B (each a glass frit according to the present invention) and comparative glass frit C were prepared according to the following procedure.

The raw materials were mixed in the speed mixer and melted as a 1 kg batch in a corundum crucible in a gas furnace at a temperature of 1250° C. for 45 min. After melting, the glass was quenched in water and dried at 120° C. for 10 h. The dried glass frit was then milled in a jet mill to a particle size distribution (PSD) of D(90)=7.5 μm. The coefficient of thermal expansion (CTE) of the glass frits was measured using a dilatometer (BAHR Thermo analyse, DIL 803). The glass transition temperature ($T_g$), the softening temperature ($T_f$), the $T_{start}$ crystallization and the $T_{peak}$ crystallization of the glass frits were measured using differential scanning calorimetry (DSC, NETZSCH, DSC 404 F3, Pegasus).

The results show that the frit with the lowest softening point is glass A. In comparison to glass C, glass A contains ions of $Na^+$ and $F^-$, which reduce the $T_g$ and softening point. Glass B has a slightly higher $T_g$ and $T_f$, but this glass can be used for laser sealing without adding black pigment as a laser absorber.

Example 2: Preparation of Compositions and Pastes for Sealing Inorganic Substrates Glass frits A and B prepared according to Example 1 were formulated into powders having the compositions shown in Table 2.

TABLE 2

| | A (wt %) | B (wt %) | Cordierite (wt %) | Aluminosilicate glass E (wt %) | MnO/CuO/Cr$_2$O$_3$-based pigment (wt %) | Sinter product D (wt %) | T$_g$ (° C.) | T$_f$ (° C.) |
|---|---|---|---|---|---|---|---|---|
| 1 | 89 | | 7 | | 4 | | 335 | 375 |
| 2 | 91 | | | 5 | 4 | | 342 | 380 |
| 3 | 92 | | | | | 8 | 334 | 478 |
| 4 | | 95 | | 5 | | | 369 | 442 |

The powder compositions were prepared according to the following procedure. In the case of Examples 1, 2 and 4, a glass frit was dry blended with a CTE filler (either cordierite (D(90)=6.7 μm) or an aluminosilicate glass powder E having the composition outlined in Table 3 (D(90)=9 μm)), and a laser absorber (a Cr$_2$O$_3$/CuO/MnO-based black pigment, D(90)=1.8 μm) and mixed in a speed mixer. In the case of Example 3, a glass frit was dry blended with a sinter product D having the composition outlined in Table 4. Sinter product D contains an aluminosilicate glass and a Cr$_2$O$_3$/CuO/MnO-based black pigment.

The results of the DSC demonstrate that adding cordierite or high-melting alumosilicate glass for reducing of the CTE has little influence on the softening point. The softening point was increased only a few degrees.

TABLE 3

| Aluminosilicate glass E (wt %) | |
|---|---|
| SiO$_2$ | 62-75 |
| Al$_2$O$_3$ | 18-28 |
| CaO | 3-7 |
| ZnO | 3-5 |
| Li$_2$O | 1.5-4 |
| BaO | 2.3-3.8 |
| MgO | 0.1-1 |
| CTE, ×10$^{-6}$/K | 1.2 |
| D(90), μm | 3.5 |

TABLE 4

| Sinter product D (wt %) | |
|---|---|
| Aluminosilicate glass | 75 |
| MnO/CuO/Cr$_2$O$_3$ based pigment | 25 |
| CTE ×10$^6$/K | 4.8 |
| D(90), μm | 3.7 |

Pastes were prepared by mixing the powder compositions 1-4 with tridecylalcohol (i.e. an alcohol-based medium) in a ratio of 6:1 using a speed mixer, before triple milling twice. The resultant pastes had a solid content of 87 wt % based upon the total weight of the paste.

Example 3: Preparation of Sealed Articles

The pastes of the present invention prepared according to Example 2 were then used to seal two glass substrates, via either a convective or radiative firing method.

A) Convective Heating Firing Method

A prepared paste was applied to two 1.8 mm thick soda lime glass substrates by screen printing using a 90-mesh screen. The wet layer thickness was 50 μm. After printing, the plates were dried at 150° C. for 10 min, placed on top of each other, clamped under a force of 18 N, and fired. The firing cycle was as follows: (i) heat 5° C./min until a firing temperature between 250 and 520° C. is reached; (ii) fire at the desired firing temperature for 20 min; and (iii) cool to room temperature at a rate of 5° C./min.

B) Radiative Heating Firing Method

A prepared paste was applied to two 1.8 mm thick soda lime glass substrates by screen printing using a 90-mesh screen. The wet layer thickness was 15-20 μm. After printing, the plates were dried at 150° C. for 10 min, pre-fired at 350° C. for 10 min, placed on top of each other, clamped under a force of 18 N, samples were heated up to 100 to 250° C. and laser scanned. The laser seal used either a diode laser with a wavelength of 808 nm or an IR laser with a wavelength of 1064 nm. The laser linear feed rate was set to 0.5 to 2 mm/s. The laser power was set between 15 to 25 W). The sealed article was cooled down to room temperature naturally.

Evaluation of Seal Strength

Each of the sealed glass articles was subjected to wafer bond testing, whereby a razor blade was forced between the two glass plates. An article which experienced substrate breakage first while the seal remained intact was evaluated as "Accepted". An article which experienced delamination of the seal prior to breakage of the substrate was evaluated as "Rejected". All tested samples fabricated according to the present invention demonstrated "Accepted" seal strength.

The invention claimed is:

1. A composition for sealing inorganic substrates, the composition comprising a glass frit and a filler material, wherein said glass frit comprises:
   60 to 85 wt % Bi$_2$O$_3$;
   3 to 15 wt % ZnO;
   2 to 10 wt % B$_2$O$_3$;
   0.5 to 5 wt % SiO$_2$;
   0.5 to 5 wt % Al$_2$O$_3$; and
   0.1 to 0.5 wt % of a compound selected from NaF and BaF$_2$, and
   wherein said filler material (i) is cordierite or an aluminosilicate glass frit or (ii) is a sintered material comprising an aluminosilicate glass frit and a laser absorber which is a coloured pigment.

2. The composition according to claim 1, wherein said glass frit comprises 65 to 80 wt %.

3. The composition according to claim 1, wherein said glass frit comprises 66 to 79 wt % Bi$_2$O$_3$.

4. The composition according to claim 1, wherein said glass frit comprises 5 to 12 wt % ZnO.

5. The composition according to claim 1, wherein said glass frit comprises one or more of the following:
   2.5 to 8 wt % B$_2$O$_3$;
   0.8 to 3 wt % SiO$_2$;
   0.8 to 3 wt % Al$_2$O$_3$; and,
   0.1 to 0.3 wt % of a compound selected from NaF and BaF$_2$.

6. The composition according to claim 1, wherein said glass frit further comprises 0.5 to 5 wt % of one or more alkali metal oxides.

7. The composition according to claim 1, wherein said glass frit further comprises BaO.

8. The composition according to claim 1, wherein said glass frit further comprises one or more transition metal oxides.

9. The composition according to claim 1, wherein said glass frit further comprises a laser absorber which is a coloured pigment.

10. The composition according to claim 1, which is substantially vanadium-free and/or substantially lead-free.

11. The composition according to claim 1, further comprising a laser absorber which is a coloured pigment.

12. The composition according to claim 1, wherein the composition meets one or more of the following requirements:
a wt % ratio of $Bi_2O_3/ZnO$ is between 4 and 28;
a wt % ratio of $ZnO/B_2O_3$ is between 0.3 and 7.5;
a wt % ratio of $Bi_2O_3/F$ is between 120 and 850; and,
a wt % ratio of $Bi_2O_3/Al_2O_3$ is between 12 and 170.

13. A paste for sealing inorganic substrates, the paste comprising:
(i) a composition according to claim 1; and
(ii) an organic medium.

14. A method of forming a bond or seal between inorganic substrates, the method comprising:
(i) providing a first inorganic substrate;
(ii) providing a second inorganic substrate;
(iii) depositing a paste onto at least a portion of at least one of the inorganic substrates,
the paste comprising (i) 60 to 85 wt % $Bi_2O_3$, 3 to 15 wt % ZnO, 2 to 10 wt % $B_2O_3$, 0.5 to 5 wt % $SiO_2$, 0.5 to 5 wt % $Al_2O_3$, and 0.1 to 0.5 wt % of a compound selected from NaF and BaF, and (ii) an organic medium;
(iv) drying said paste to form a dried paste;
(v) optionally pre-firing the dried paste to remove organic medium;
(vi) assembling the first and second substrates such that the dried paste lies therebetween and in contact with both substrates; and
(vii) firing said dried paste.

* * * * *